Figure 1:
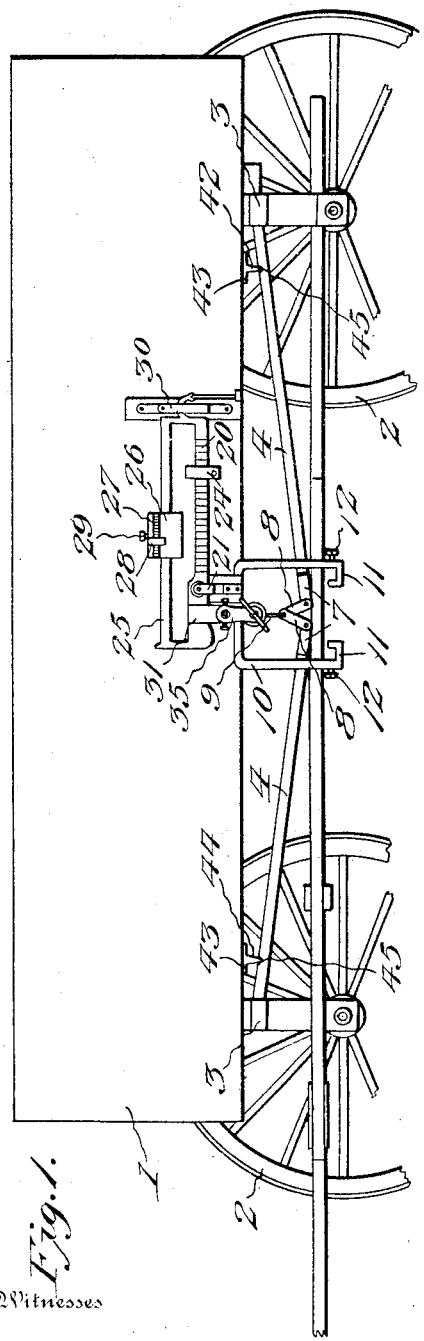

No. 777,440. PATENTED DEC. 13, 1904.
C. SKIDMORE.
WEIGHING MECHANISM FOR VEHICLES OR OTHER DEVICES.
APPLICATION FILED FEB. 17, 1904.
NO MODEL. 4 SHEETS—SHEET 1.

Witnesses
Edwin F. McKee
Chas. S. Hyer

Inventor
Charles Skidmore
By Victor J. Evans
Attorney

No. 777,440. PATENTED DEC. 13, 1904.
C. SKIDMORE.
WEIGHING MECHANISM FOR VEHICLES OR OTHER DEVICES.
APPLICATION FILED FEB. 17, 1904.
NO MODEL. 4 SHEETS—SHEET 2.
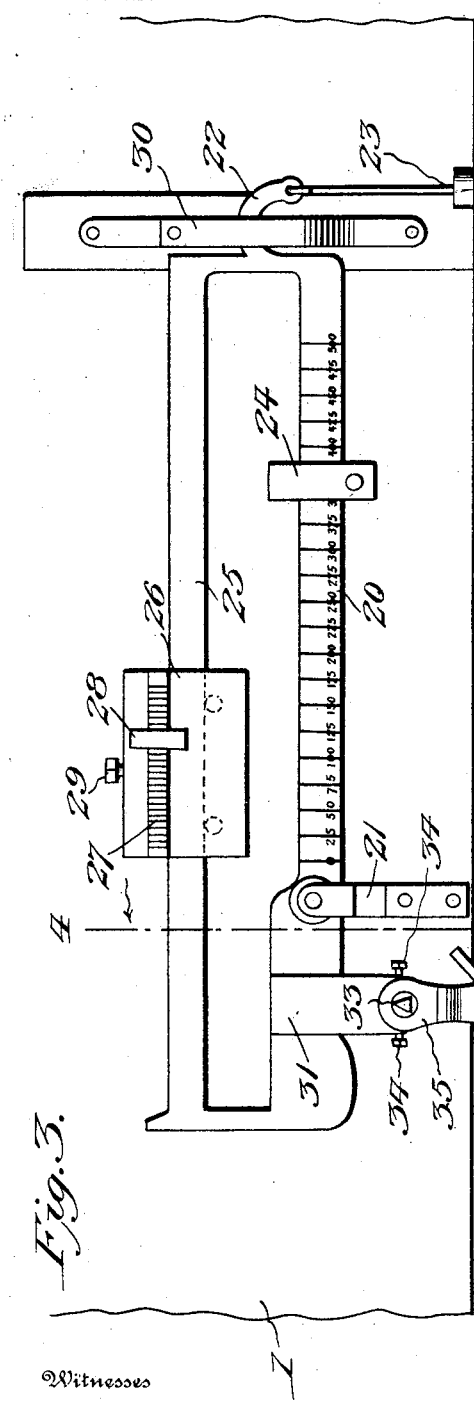
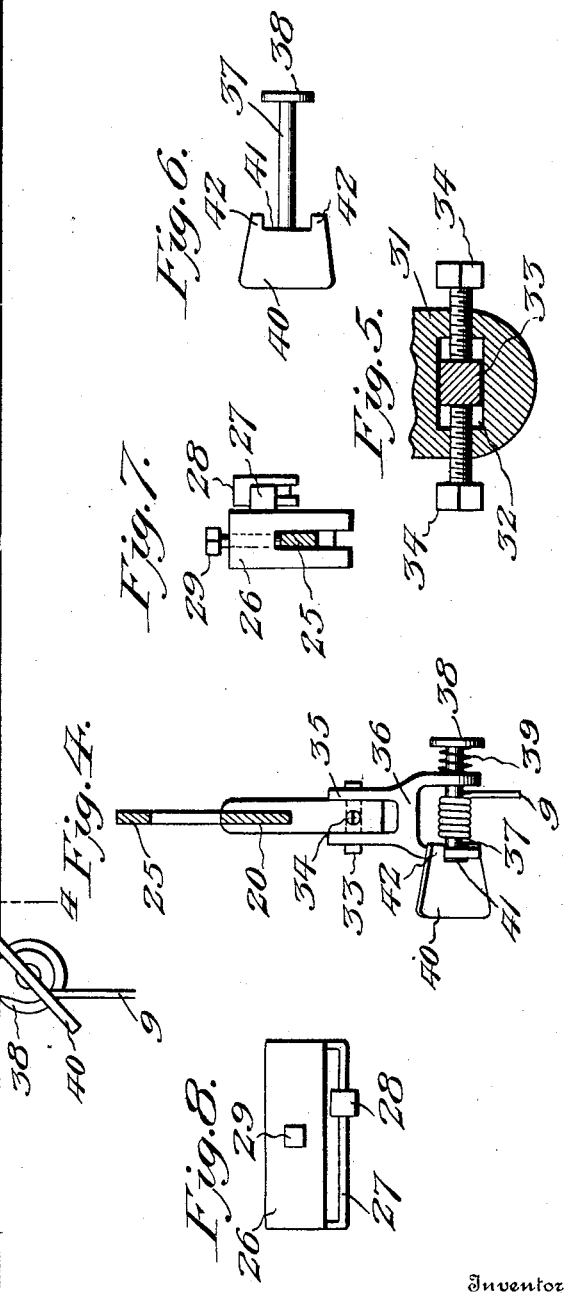
Witnesses
Edwin G. McKee
Chas. S. Hyer
Inventor
Charles Skidmore
By Victor J. Evans,
Attorney No. 777,440. PATENTED DEC. 13, 1904.
C. SKIDMORE.
WEIGHING MECHANISM FOR VEHICLES OR OTHER DEVICES.
APPLICATION FILED FEB. 17, 1904.
NO MODEL. 4 SHEETS—SHEET 3.

Witnesses
Edwin L. McKee
Chas. S. Hyer.

Inventor
Charles Skidmore
By Victor J. Evans.
Attorney

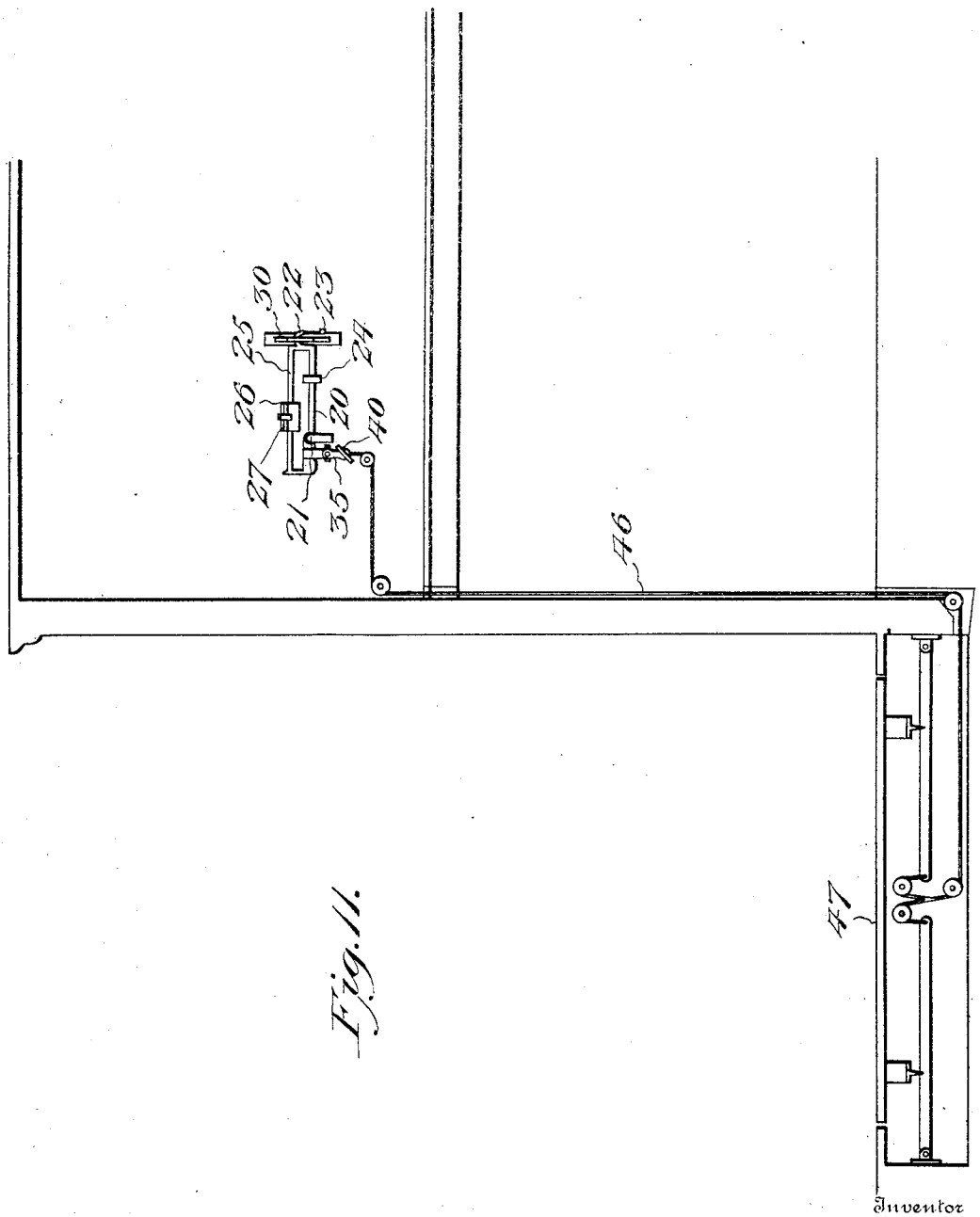

No. 777,440.  
Patented December 13, 1904.

UNITED STATES PATENT OFFICE.

CHARLES SKIDMORE, OF HOMER, NEBRASKA.

WEIGHING MECHANISM FOR VEHICLES OR OTHER DEVICES.

SPECIFICATION forming part of Letters Patent No. 777,440, dated December 13, 1904.

Application filed February 17, 1904. Serial No. 193,966. (No model.)

*To all whom it may concern:*

Be it known that I, CHARLES SKIDMORE, a citizen of the United States, residing at Homer, in the county of Dakota and State of Nebraska, have invented new and useful Improvements in Weighing Mechanism for Vehicles or other Devices, of which the following is a specification.

This invention relates to new and useful improvements in weighing attachments or mechanism for wagons, cars, and other vehicles; and the primary object of the same is to provide means in connection with a wagon or car body for determining the weight of the latter when empty or loaded, said means being readily accessible and operative to determine with accuracy the weight of a body or load and also easily applicable to wagon and car bodies now in use without materially disturbing the organization thereof and the running-gear or mechanism therefor.

The invention consists, primarily, of levers applied to opposite extremities of the under side of a car or wagon body and coöperating with knife-edges depending from said body, the levers being attached by a flexible means to scale-beam mechanism arranged on one side of the body. This scale-beam mechanism includes a main beam divided by scale-marks designating a certain number of pounds, the several marks successively increasing in the same number of pounds, and a separate poise or counterbalance having thereon scale-marks designating the number of pounds and fractions of the latter included between each of the scale-marks on the said main beam.

The invention further consists in simple and effective means for adjusting the scale mechanism to accommodate different lengths of wagon or car bodies.

The invention still further consists of levers coöperating with the under sides of the body and having flexible devices attached thereto and engaging a winding drum or spool provided with automatically-operating locking means.

The invention still further consists in the details of construction and arrangement of the several parts, which will be more fully hereinafter set forth.

Figure 2:
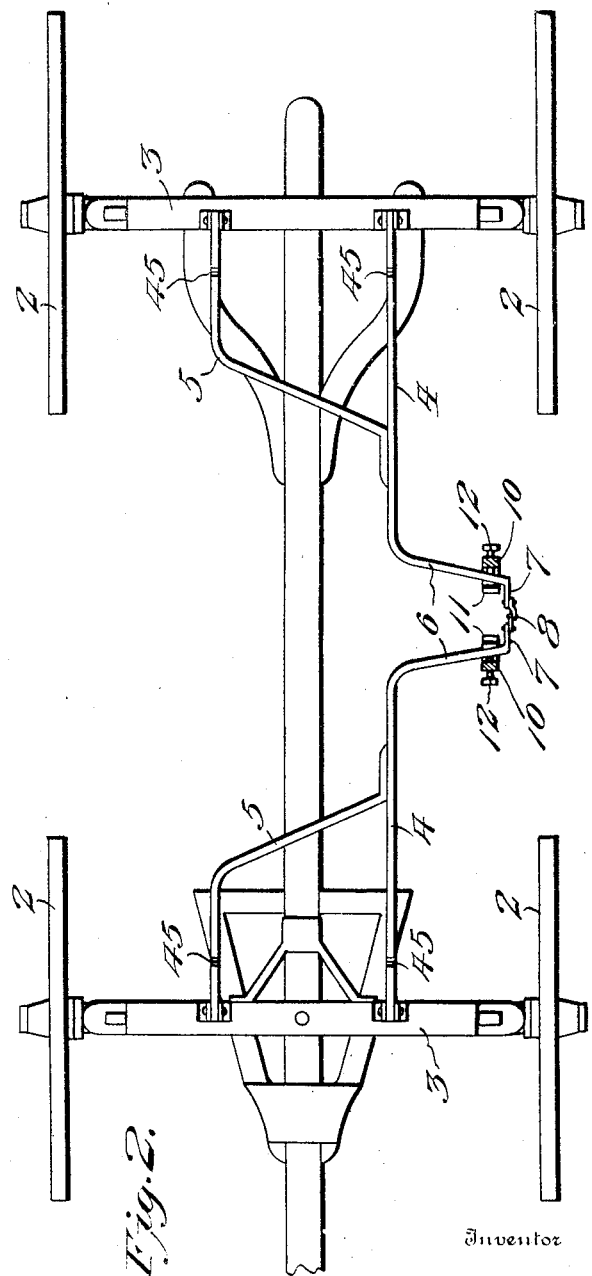
Figure 9:
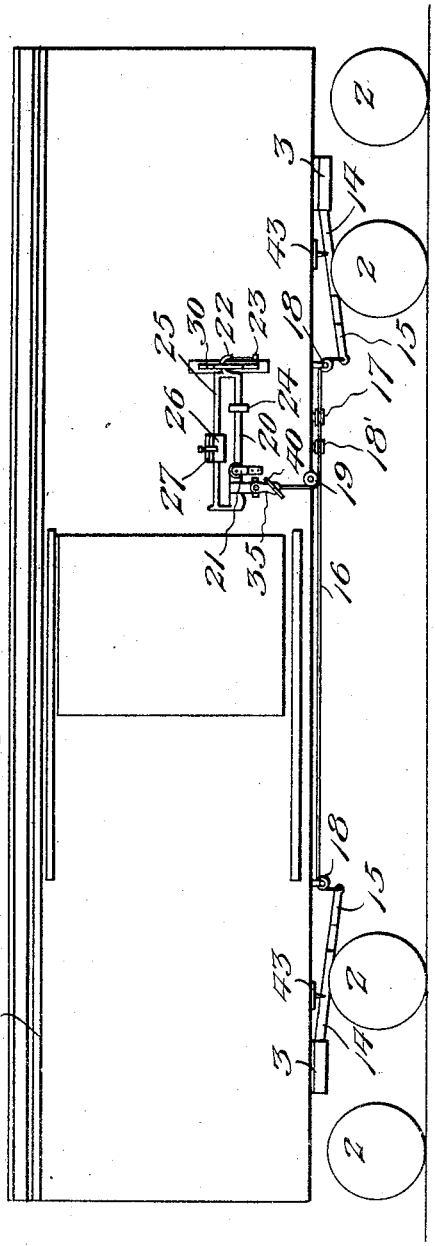
Figure 10:
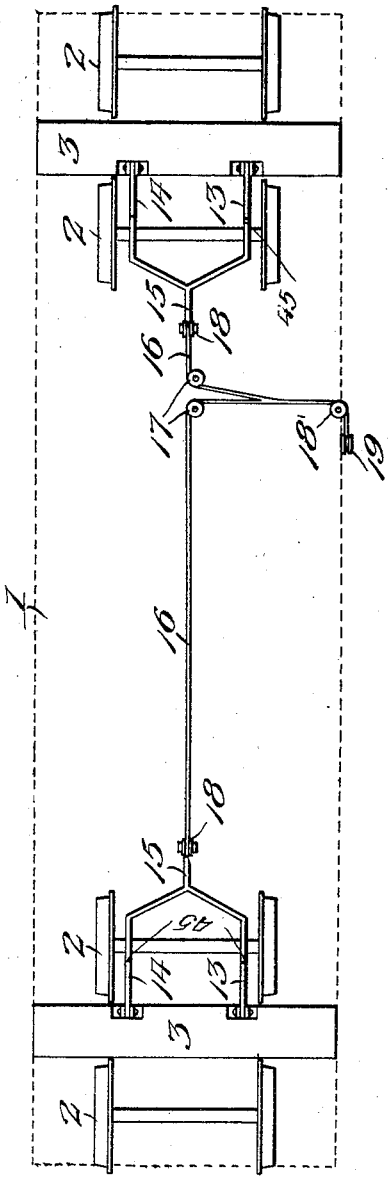

In the drawings, Figure 1 is a side elevation of a wagon-body, showing the improved weighing devices applied thereto. Fig. 2 is a top plan view of the running-gear of a wagon, showing the manner of attaching the improved weighing devices thereto. Fig. 3 is an enlarged side elevation of a portion of a wagon or other vehicle body, illustrating the improved scale-beam mechanism. Fig. 4 is a transverse vertical section of the scale-beam mechanism on the line 4 4, Fig. 3. Fig. 5 is a top plan view of a part of the scale-beam mechanism, showing the means for adjusting the knife-edge for suspending the winding mechanism. Fig. 6 is a top plan view of a part of the winding mechanism. Fig. 7 is an end elevation of an auxiliary poise used in connection with the scale-beam mechanism. Fig. 8 is a top plan view of the device shown by Fig. 7. Fig. 9 is a side elevation of a car, showing the improved weighing devices applied thereto. Fig. 10 is a top plan view of the running-gear of a car, showing the body in dotted lines and illustrating the manner of attaching the levers and flexible connections. Fig. 11 is a diagrammatic view showing the use of the improved weighing mechanism in connection with ordinary scale-platforms and the balance devices located at a distance from the platform.

Similar numerals of reference are employed to indicate corresponding parts in the several views.

The numeral 1 designates the body of a vehicle for either a car or a wagon or other device adapted for transporting loads and arranged on running-gear or mechanism 2, having supporting-bolsters 3. The application of the improved scale mechanism does not require a change in the organization of the ordinary running-gear or mechanism and may be quickly and easily applied to wagons or cars now in use.

Secured to the supporting-bolsters 3, as shown by Figs. 1 and 2, are levers 4 and 5, a pair of these levers being attached to each bolster by suitable pivot devices and the lever 5 deflected at an intermediate point toward and secured to the adjacent lever 4. Both levers 4 are projected inwardly adjacent to one side of the under portion of the body 1 and then extended outwardly in the form of angular attaching-arms 6, which have a slight convergence. The outer terminals of the arms 6 are deflected inwardly at an angle toward each other, as at 7, and movably attached thereto are the lower ends of links 8, having their upper ends brought into close relation and secured to the lower terminal of a winding cable 9. Instead of a cable a wire of suitable gage may be employed, or at times other flexible means may be substituted for the cable and wire. Depending from the side of the body 1 is a holding frame or support 10, having opposite parallel side members with inturned angular ends 11, shaped to provide seats for the reception of the outer extremities of the arms 6 when the weighing mechanism is not in use. The frame or support 10 has opposite clamping-screws 12 extending into the seats to engage the arms 6 and hold the latter and parts coöperating therewith in immovable position to prevent injury thereto or wear thereon by vibration of the wagon or other vehicle.

The difference in construction shown by Figs. 9 and 10 consists in forming the levers 13 and 14 of equal length and converging the inner ends thereof to a central draw-bar 15, to which is movably attached a cable, wire, or analogous device 16. The cables, wires, or analogous devices 16 extend toward each other from the draw-bars 15 and engage horizontally-disposed guide-pulleys 17, spaced apart from each other and secured against the under side of the car-body. The cables, wires, or analogous devices 16 also extend over depending guide pulleys or sheaves 18, attached to the under side of the car-body above the ends of the draw-bars 15, and both cables, wires, or analogous devices after leaving the guide-pulleys 17 project outwardly toward one side of the car and unitedly pass around a horizontally-disposed guide-pulley 18' and from the latter pass to a vertically-disposed edge pulley 19. From this edge pulley 19 the single form of the cable, wire, or analogous device connects with the scale-beam mechanism, which will be now described. This scale-beam mechanism is more clearly shown, on an enlarged scale, by Fig. 3 and consists of a lower beam 20, divided into equal parts by suitable scale-marks to represent twenty-five-pound designations, the latter gradually increasing from zero. In other words, each space on the beam 20 between the division-lines represents twenty-five pounds, and from the lowest number of pounds these spaces gradually increase regularly twenty-five pounds. The beam 20 is held at its rear portion on a fulcrum post or support 21, attached to the side of the body, and its opposite end is provided with a crook or curved arm 22, to which a balancing-weight 23 is attached, as in ordinary scale structures. A poise 24 is also slidably disposed on the beam 20 for obvious use. Connected to or integrally formed with the beam 20 is an upper supplemental beam 25, on which is slidably disposed an enlarged counterbalance for the wagon or other body to which the scale mechanism is applied. The counterbalance on the supplemental beam 25 consists of a metal block 26 of determined dimensions and weight, and projecting outwardly from the upper part thereof is a fixed weighing-beam 27, divided by suitable scale-marks from one to twenty-five pounds. On this fixed beam 27, which is in the form of a light bar, a poise 28 is slidably mounted and similar in construction to though smaller than the poise 24. It will be understood that the poises 24 and 28 serve as indicators, and the fixed beam 27, graduated as set forth, is used to determine the number of pounds between the multiples of twenty-five pounds indicated on the beam 20, so that if a load weighed two hundred and forty-two pounds, for instance, the poise 24 would be adjusted to the two-hundred-and-twenty-five indication on the beam 20 and the poise 28 would be moved on the beam 27 to the mark designating seventeen pounds. The advantage of this construction and arrangement of the scale-beam mechanism is that considerable expense and labor is saved in the application of the divisions to the beam 20 to designate the intermediate pounds between the multiples on said beam, and, furthermore, reading of the number of pounds by the use of the main and auxiliary beams will be rendered much easier. After the body-counterbalance 26 has been adjusted on the supplemental beam 25 it can be held in fixed position by a set-screw 29 passing vertically therethrough and engaging said beam 25. The arm 22 has free movement in a guide 30, secured to the side of the body 1, and as this construction and the purpose of the same is obvious further description thereof is deemed unnecessary. The opposite end of the beam mechanism projects beyond the fulcrum post or support 21 and is provided with a pendant 31, having a lower slotted terminal 32, in which is adjustably mounted a knife-edge 33. Engaging opposite portions of the said knife-edge are adjusting-screws 34, and by turning said screws the knife-edge may be shifted in either one of two directions for a purpose which will be presently explained. The knife-edge 33 projects transversely through the lower end of the pendant 31, and loosely engaging the opposite extremities thereof and embracing the said pendant is the upper bifurcated extremity 35 of a depending yoked hanger 36, having a winding spindle, drum, or analogous device 37 freely mounted to rotate in the arms thereof. This spindle 37 is longitudinally slidable in the arms of the hanger and has an inner terminal head 38, between which and the adjacent arm of the hanger a retractile spring 39 surrounds the spindle and operates to draw the latter inwardly. On the outer end of the spindle 37 is an operating-head 40 of flat contour, having a slot 41 at its inner terminal adjacent to the spindle to provide opposite locking-shoulders 42, which are adapted to be pulled inwardly against the outer arm of the hanger 36 and prevent rotation of the spindle.

The single cable extending upwardly from the guide-pulley 19, as shown by Figs. 9 and 10, or the single cable, wire, or analogous device 9 (shown by Fig. 1) is attached to the spindle 37 between the arms of the hanger 36, and said cable or analogous device is adapted to be wound on or unwound from said spindle.

It is proposed to use a movably-attached stake for wagon-bodies equipped with the improved scale mechanism of the form shown in my Patent No. 732,228, granted June 30, 1903, and a similar stake means will also be used with the car arrangement illustrated by Figs. 9 and 10. The purpose of these devices is, as fully set forth in my patent, to raise the body sufficiently to permit the weighing mechanism in connection therewith to be thrown into operation.

Secured to the under side of the vehicle-body, as shown by Fig. 1, and to the car-body, as illustrated by Fig. 9, are transversely-extending T-beams 43, which have depending sharpened members to provide knife-edges 44 for engagement with the levers 4 and 5 and 13 and 14, the latter at the points where the said knife-edges 44 bear upon the same or contact therewith being constructed with corresponding depressions 45, as clearly shown by Figs. 2 and 10.

In the operation of either form of the device as set forth the levers are drawn up against the knife-edges 44 after the stakes or analogous devices have been released, and the spindle 37 is turned in such direction as to cause the flexible connection between the levers and the said spindle to be drawn taut and wound on the said spindle, the latter during such winding movement being drawn outwardly against the resistance of the spring 39 to clear the shoulders 42 from the outer arm of the hanger 36. When the body 1 has been brought to a condition of suspension or support solely by the levers, the body-counterbalance 26 is moved on the beam 25 until the entire scale-beam mechanism, including the beam 20, balances, the poises 24 and 28 being primarily moved back to the zero-points on their respective beams. The scale-beam mechanism is now in condition for weighing the load contained in the body, and the poise 24 is first moved longitudinally on the beam 20 as far as possible in accordance with the multiple divisions arranged on the said beam, and if the weight of the load calls for an odd number of pounds greater than the multiple nearest the correct weight of the load, as indicated by the poise 24, the poise 28 will be shifted on its beam 27 to indicate correctly the odd number of pounds. After the weight of the load has been ascertained the parts of the weighing mechanism will be restored to normal position by unwinding the flexible connecting device engaging the spindle 37, and by the use of the weighing mechanism as set forth in connection with a wagon, car, or other vehicle body a great convenience will result, in view of the fact that the load of the vehicle or car body may be readily ascertained without transporting or shifting the same to and over a platform weighing means. Moreover, the weight of the load in a vehicle or car body can be quickly determined by the use of the improved mechanism at points where weighing-platforms are not accessible.

Another useful application of the improved weighing mechanism is shown by Fig. 11 and consists in arranging the improved mechanism in connection with an ordinary weighing-platform, and in this instance a cable, wire, or analogous flexible device 46 runs from a scale-platform 47, equipped with the usual levers, to an inclosure or to a point at a considerable elevation above the platform and connects with scale-beam mechanism similar to that heretofore described.

It will be understood that changes in the proportions, dimensions, and minor details may be resorted to without in the least departing from the spirit of the invention.

Having thus fully described the invention, what is claimed as new is—

1. In a weighing mechanism of the class set forth, the combination with a load-supporting means, of levers coöperating therewith, a scale-beam mechanism having a winding device provided with locking means, and a flexible connection between said winding device and levers and directly engaging the winding device.

2. In a weighing mechanisn of the class set forth, the combination with load-supporting means, of movable elements coöperating with said means, a scale-beam mechanism having a winding device adjustably supported thereby and provided with locking means, and a flexible connection between said winding device and elements.

3. In a weighing mechanism of the class set forth, the combination with load-supporting means, of movable elements coöperating with said means, a scale-beam mechanism, a winding device movably suspended from one extremity of the said mechanism and provided with means for holding the same against rotation and also for adjusting the same, and a flexible connection between the said winding device and elements.

4. In a weighing mechanism of the class set forth, the combination with a vehicle-body, of pivoted levers movably applied to the underside of the said body, means on the body for engaging the said levers, a scale-beam mechanism applied to one side of the body and having a winding device in connection with one extremity thereof, and a flexible connection between the said winding device and levers, the flexible connection extending under the body.

5. In a weighing mechanism of the class set forth, the combination with load-supporting means, of movable elements coöperating therewith, a scale-beam mechanism, a knife-edge carried by a movable terminal of said mechanism and slidably adjustable longitudinally with respect to said mechanism toward and away from the fulcrum of the latter, a winding device movably supported by the said knife-edge, and a flexible connection between the said winding device and the said elements.

6. In weighing mechanism of the class set forth, the combination with load-supporting means, of movable elements coöperating therewith, scale-beam mechanism, winding devices movably depending from the scale-beam mechanism and including a sliding spindle having a locking attachment, and a flexible connection between the said elements and winding mechanism.

7. In weighing mechanism of the class set forth, the combination of a vehicle-body, inwardly-extending levers having supporting means and coöperating with said body, a scale-beam mechanism attached to the side of the body and having a winding device, and a flexible connection between the said levers and winding device.

8. In weighing mechanism of the class set forth, the combination with a vehicle-body, inwardly-extending levers having supporting means and coöperating with said body, and arranged to hold the latter in suspension, a scale-beam mechanism held by the body and having a balancing device for the latter, and a flexible device movable under and upwardly over one side of the body and directly connected to the said levers and scale-beam mechanism.

9. In weighing mechanism of the class set forth, the combination with a vehicle-body, of inwardly-extending levers coöperating with said body and arranged to hold the latter in suspension, a scale-beam mechanism held by the body, and a flexible connection between the scale-beam mechanism and the levers, the said connection being movable under the vehicle-body and having parts extending in opposite directions.

10. In weighing mechanism of the class set forth, the combination with a vehicle-body, of knife-edges depending therefrom, pivoted levers having supporting means and coöperating with said body and arranged to engage the said knife-edges, scale-beam mechanism held by the body and having a winding device, and a flexible connection between the winding device and levers.

11. In weighing mechanism of the class set forth, the combination with a vehicle-body, of inwardly-extending levers coöperating with said body and arranged to hold the latter in suspension, a scale-beam mechanism held by the body and having an adjustable knife-edge, a winding device suspended from said knife-edge, means for locking said winding device against movement, and a flexible connection between the scale-beam mechanism and the levers.

12. In weighing mechanism of the class set forth, the combination with a vehicle-body, of inwardly-extending levers coöperating with said body and arranged to hold the latter in suspension, a scale-beam mechanism held by the body, a connecting means between the scale-beam mechanism and the levers, and a supporting means for the contiguous ends of the levers to prevent movement of the latter when not in use.

13. In weighing mechanism of the class set forth, the combination with a load-supporting means, of levers coöperating therewith, a scale-beam mechanism, a hanger movably depending from said scale-beam mechanism, and having a winding-spindle slidably mounted therein, and a flexible connection between the said spindle and levers.

14. In weighing mechanism of the class set forth, the combination with a load-supporting means, of levers coöperating therewith, a scale-beam mechanism, a hanger movably depending from said scale-beam mechanism and having a winding-spindle slidably mounted therein, a shouldered locking device on one end of the spindle, a retractile spring engaging the opposite end of the spindle, and a flexible connection between the spindle and the levers.

In testimony whereof I affix my signature in presence of two witnesses.

CHARLES SKIDMORE.

Witnesses:
    JOHN L. FLETCHER,
    CHAS. S. HYER.